S. T. SHANNON.
WHEEL STRUCTURE.
APPLICATION FILED APR. 19, 1916.

1,202,906.

Patented Oct. 31, 1916.

Inventor
S T. SHANNON

By Watson E. Coleman
Attorney

UNITED STATES PATENT OFFICE.

SAMUEL T. SHANNON, OF WILLOW SHADE, KENTUCKY.

WHEEL STRUCTURE.

1,202,906.  Specification of Letters Patent.  Patented Oct. 31, 1916.

Application filed April 19, 1916. Serial No. 92,261.

*To all whom it may concern:*

Be it known that I, SAMUEL T. SHANNON, a citizen of the United States, residing at Willow Shade, in the county of Metcalfe and State of Kentucky, have invented certain new and useful Improvements in Wheel Structures, of which the following is a specification, reference being had to the accompanying drawings.

This invention relates to certain improvements in wheel structures and it is an object of the invention to provide a novel and improved wheel whereby the shocks or jars incident to travel are substantially absorbed.

The invention consists in the details of construction and in the combination and arrangement of the several parts of my improved wheel structure whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1:
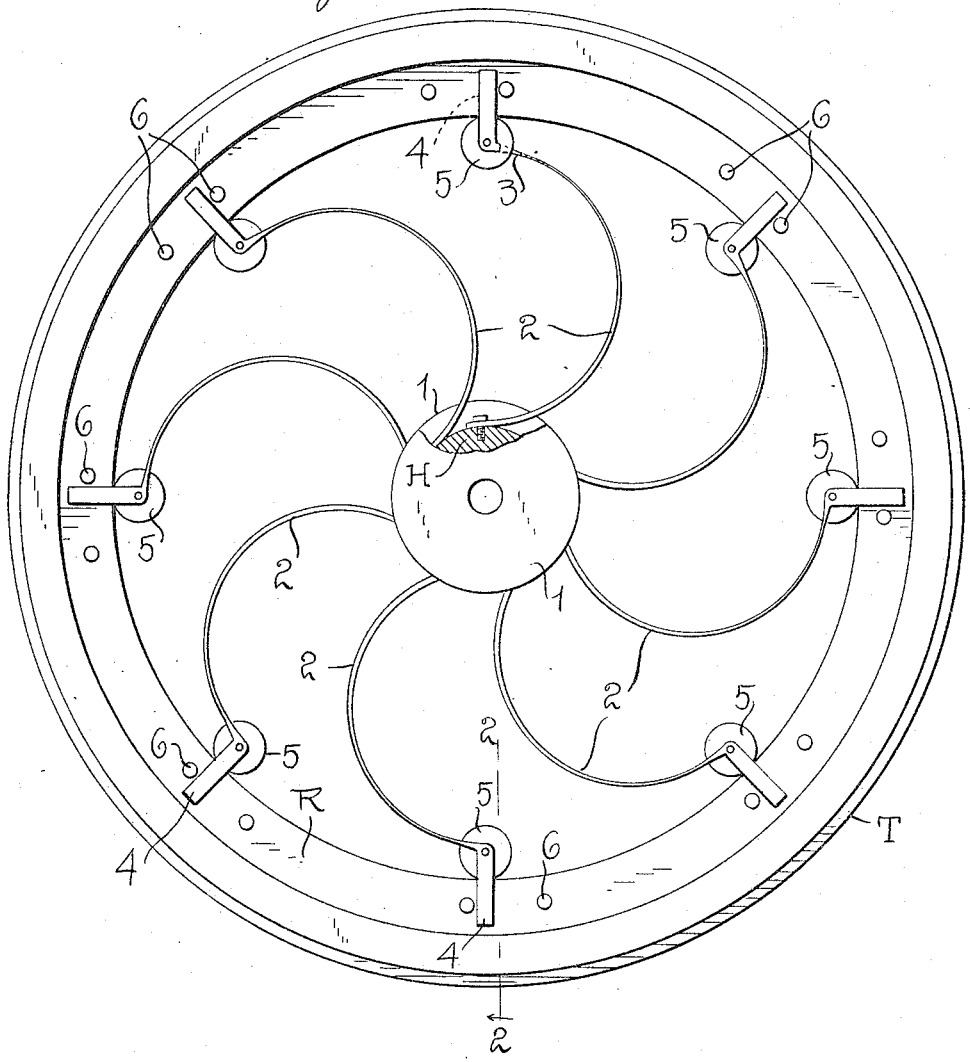
Figure 2:
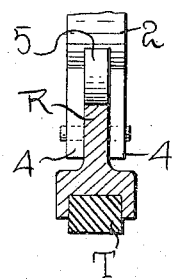

Figure 1 is a view in elevation with a portion in section of a wheel constructed in accordance with an embodiment of my invention; and Fig. 2 is a sectional view, slightly enlarged, taken substantially on the line 2—2 of Fig. 1.

As disclosed in the accompanying drawings, R denotes the rim of a wheel and around which is disposed a tread member T preferably of solid rubber.

H denotes a hub member provided at its opposite sides with the annular flanges 1, and secured to the hub H between said flanges 1 are the inner extremities of the resilient spokes 2 herein disclosed as embodying flat springs substantially semi-circular in form when not under load and having their outer extremities bifurcated, as at 3, the free end portions of the arms of the bifurcation being extended outwardly, as indicated at 4, and overlying the opposite sides of the rim R to hold the spokes against undue lateral movement relative to the rim.

Rotatably supported within the kerf of the bifurcation 3 of each of the spokes 2 is a roller 5 and which has rolling contact with the inner wall of the rim R and being maintained in constant contact therewith by the resiliency of the spoke 2. The outwardly extending portions 4 of the spokes 2 are disposed between the stops 6 projecting laterally from the side faces of the rim R and spaced apart a predetermined distance in a circumferential direction.

From the foregoing description, it is thought to be obvious that a wheel structure constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A wheel structure consisting of a hub, a rim, resilient spokes secured to the hub, and rollers supported by the outer extremities of the spokes and having rolling contact with the inner wall of the rim, the outer extremities of the spokes being provided with extensions overlying the side faces of the rim.

2. A wheel structure consisting of a hub, a rim, resilient spokes secured to the hub, rollers supported by the outer extremities of the spokes and having rolling contact with the inner wall of the rim, the outer extremities of the spokes being provided with extensions overlying the side faces of the rim, and stop members carried by the side faces of the rim and coacting with the overlying extensions of the spokes.

In testimony whereof I hereunto affix my signature in the presence of two witnesses.

SAMUEL T. SHANNON.

Witnesses:
S. S. HARVEY,
SMITH FERGUSON.